(12) United States Patent
Easter

(10) Patent No.: US 7,037,459 B2
(45) Date of Patent: May 2, 2006

(54) METHODS OF MAKING COMPOSITIONS COMPRISING THERMOPLASTIC AND CURABLE POLYMERS AND ARTICLES MADE FROM SUCH METHODS

(75) Inventor: Mark R. Easter, Indianapolis, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 265 days.

(21) Appl. No.: 10/094,805

(22) Filed: Mar. 12, 2002

(65) Prior Publication Data

US 2002/0135105 A1 Sep. 26, 2002

Related U.S. Application Data

(60) Provisional application No. 60/274,632, filed on Mar. 12, 2001.

(51) Int. Cl.
*B29C 44/06* (2006.01)
*B29C 44/24* (2006.01)
*B29C 47/06* (2006.01)

(52) U.S. Cl. ............... 264/417; 156/244.12; 264/45.9; 264/279.1; 264/418; 264/420; 264/421; 264/474; 264/475

(58) Field of Classification Search ........... 156/244.11, 156/244.12; 264/45.9, 175, 413, 417, 418, 264/464, 279.1, 420, 421, 474, 475
See application file for complete search history.

(56) References Cited

U.S. PATENT DOCUMENTS 3,616,198 A * 10/1971 Saito .......................... 428/461
4,003,777 A * 1/1977 Eddy .......................... 156/246
4,985,525 A * 1/1991 Clark et al. .................... 528/15
5,166,484 A 11/1992 Young et al.
5,178,927 A * 1/1993 Turner ......................... 428/71
5,458,824 A * 10/1995 Powers et al. ............... 264/474
5,489,664 A * 2/1996 Parodi et al. ................. 528/73
5,529,650 A * 6/1996 Bowers et al. ................ 156/64
5,716,574 A 2/1998 Kawasaki
5,721,286 A 2/1998 Lauf et al.
6,075,063 A 6/2000 Jandali
6,080,810 A 6/2000 Ribarits et al.
6,169,276 B1 1/2001 Meyer
6,357,197 B1 * 3/2002 Serino et al. ............... 52/738.1

FOREIGN PATENT DOCUMENTS

| EP | 0 962 944 B1 | 10/1998 |
|---|---|---|
| EP | 0792 217 B1 | 1/2001 |
| EP | 1072 380 A2 | 1/2001 |
| EP | 1072 380 A3 | 1/2001 |
| WO | WO 96/01171 | 1/1996 |
| WO | WO 97/08005 | 3/1997 |
| WO | WO 97/36965 | 10/1997 |
| WO | WO 00/36612 | 6/2000 |
| WO | WO 00/68957 | 11/2000 |

* cited by examiner

*Primary Examiner*—Allan R. Kuhns
(74) *Attorney, Agent, or Firm*—Blank Rome LLP

(57) ABSTRACT

Manufactured articles and methods of producing such articles are disclosed where the article has a thermoplastic polymer component and a curable polymer component. The curable polymer may be moisture-curable polymer, or microwave, dielectric or radio frequency curable polymer. The articles may be manufactured by a variety of polymer processing methods including extrusion, co-extrusion, co-molding, injection molding and calendering. A variety of articles and shapes may be made by the method including electric wire and cable, and weatherstripping.

21 Claims, 5 Drawing Sheets

METHODS OF MAKING COMPOSITIONS COMPRISING THERMOPLASTIC AND CURABLE POLYMERS AND ARTICLES MADE FROM SUCH METHODS

This application claims the benefit of priority under 35 U.S.C. §119(e) of U.S. Provisional Patent Application Ser. No. 60/274,632, filed Mar. 12, 2001.

FIELD OF THE INVENTION

The present invention relates to the composition and manufacture of consumer products and extruded profiles. More specifically the present invention relates to consumer products and extruded profiles where a part of the consumer product or extruded profile has a portion which is subject to heat, compressive stress, or needs elastic recovery or other properties where a crosslinked state would be beneficial and where in the other portion it is desirable to have other properties or where the combination is desired to have overall lower cost.

BACKGROUND OF THE INVENTION

Thermoplastics are widely used for extruded and molded products because of the high speed at which they can be extruded or injected into molds. They may be heated to high temperatures where their viscosity is lower, so they fill molds more quickly and completely. The polymers are also generally less expensive because they do not contain cross-linking agents which are themselves costly and frequently require an extra process to incorporate into the polymer. Overall cycle times and extrusion speeds are higher because no secondary cross-linking step is necessary.

Thermoplastic polymers, however will re melt when exposed to heat, experience creep, and will not return to their original shape when stretched or stressed and may have lower solvent resistance.

Thermosetting polymers have desirable properties such as heat resistance, abrasion resistance, low creep and higher modulus, elastic recovery and chemical resistance because of the ties or cross links between the polymer chains but typically must be processed at lower speeds and temperatures to prevent premature cross linking and then undergo a separate cross linking step. It should be noted that high modulus can be equated to stiffness in that it takes more energy or force to bend a profile or article but is not the same as rigid which means very high modulus. Rigid articles can be produced by the methods of the invention but are typically made with less expensive not cross-linked stiffer plastic such as ABS and PVC. In certain instances, for example chemical resistance, cross-linked plastics may be desired, however.

It should be understood that in the context of this invention, un cross-linked polymers are also called thermoplastic and cross-linked polymers are also called thermosetting. Some polymers may be processed as thermoplastic and also can be made to be thermosetting by the addition of a cross linking agent or by undergoing special processing steps while other polymers are difficult or impossible to cross link and are always thermoplastic. In the context of this application thermosetting polymers are defined as those that have cross linking agents and thermoplastic polymers are defined to be polymers that cannot be crosslinked or that do not have cross linking agents added.

The conventionally accepted definition for thermoplastics has been that a thermoplastic polymer can always be heated to soften the thermoplastic polymer. These polymers may be linear and in some cases have some branching of the polymers.

The conventionally accepted definition for thermosetting plastics or polymers is that a thermosetting polymer, once cured, can not be further shaped by heat because such polymers are space network polymers and are highly cross-linked to form rigid three-dimensional molecular structures, such as in urea-formaldehyde or phenol-formaldehyde resins.

The cross-linking or curing of the curable polymers of the invention causes them to have properties of conventional thermosetting resins, and accordingly, the curable polymers of the invention are called thermosetting in the context of this invention.

Co-extruded and co-molded products and the like are well known in the art. Films, electrical cables, and articles where different colors are desired on different parts of the article are often co-extruded. Most heat sealable food packaging is made in the extruded or blown film process with several layers for sealing, oxygen and moisture barrier, strength and outside layers suitable for printing being processed in one step. Many articles are manufactured by co-injection or over molding. Other articles are molded with stiff thermoplastic components in their structure and then flexible thermoplastics areas for hinges, snap fit attachments and the like.

EP 1 072 380 A2 discloses a co-extruded profile that is combined with molded profiles to obtain an article with a soft portion and a rigid portion, both uncured. PCT WO 96/01171, WO 97/08005, EP 0 792 217 B1 and U.S. Pat. No. 6,169,276 disclose examples of co-extruded profiles.

Co-extruded or blown films must typically include "tie layers" or adhesives to adhere the different polymers together. Due to the high temperatures necessary to melt some of the polymer layers and provide high throughputs, cross-linkable polymers are not used. Tie layers add expense while providing little or no added benefit to the construction.

Thermosetting polymers and thermoplastics may be co molded successfully. A commercial pan handle is produced by injecting a thermosetting component onto the walls of the mold and then injecting a thermoplastic core. If carefully controlled the hotter thermoplastic part may speed the cure of the thermosetting portion. The article must still be heated in the mold to complete the cross linking reaction and then cooled, before being ejected from the mold, causing long cycle times.

Moisture-curable polymers are available and have been used. Such polymers, based on polyethylene, are commercially available as Aquathene® from Equistar Chemicals, Aqualink® from AT plastics and Silink® from Union Carbide. Many olefins or other polymers that can be crosslinked with organic peroxides can be crosslinked with moisture. Polymers that can be crosslinked with peroxide can be made to be moisture-curable by grafting 0.1 to about 5% vinyl trimethoxysilane, for example, on their backbone with organic peroxide in an extruder of suitable length at a temperature over the decomposition temperature of the peroxide and with the addition of 0.1 to about 1% peroxide, 0.1 to about 3% dibutyl tin dilaurate, carboxylate of zinc, lead, iron or colbalt or certain base or acid catalysts. Such mixtures of moisture cure systems are commercially available from OSI Inc. as Silcat R®. Other combinations of silanes, peroxides and catalysts are available or can be custom blended for specific applications. The polymer may be grafted in the extruder and then injected directly in the production of the article of manufacture or can be pelletized for later use. Other moisture cure systems utilizing various chemistries are also available. Moisture curing takes place when the hydrolyzable silane groups are hydrolysed under the influence of water, resulting in the splitting-off of alcohol and the formation of silanol groups. In a second step the silanol groups are cross-linked by a condensation reaction. In both steps a silanol condensation catalyst is used as a catalyst. Details may be found in British Polymer Journal 21 (1989), pp. 117 to 123.

In medium voltage power cables up to three layers, the inner and outer containing carbon black to provide electrical conductivity, are co-extruded and all cured with moisture or peroxide. PCT WO 00/68957, WO 00/36612, U.S. Pat. Nos. 6,080,810 and 5,716,574 are examples and incorporated herein by reference. EP 0 926 944 A1 discloses a moisture cable and teaches that moisture cure can not by used with peroxide cure.

Microwave, dielectric or radio frequency heating and curing of polymers is known in the art. U.S. Pat. No. 5,721,286 discloses a method for curing polymers with microwave energy in a continuous fashion. U.S. Pat. No. 5,166,484 discloses an improved method of continuously curing rubber parts and the like with more uniform heating. U.S. Pat. No. 6,075,063 discloses a method for forming a component of high rigidity by foaming inside hollow cavities of the rigid article using microwave energy. PCT international publication WO 97/36965 discloses forming a composite by incorporating a electrically conductive pattern between the layers that generate heat that melts adhesive layers when exposed to microwave, dielectric or radio frequency energy. While microwave curing has many advantages it is rarely used because of the higher initial cost, the need to tailor the system to the article being cured and the fact that current manufacturing equipment in use has a long life and can be repaired and rebuilt easily. The advantages gained by utilizing the methods in the invention, and the likelihood that new production lines would be needed for the improved products, far outweigh the disadvantages disclosed, however.

None of the prior art discloses a moisture-curable or microwave, dielectric or radio frequency curable polymer composition that is co-extruded, calendered or co-molded with a thermoplastic polymer.

SUMMARY OF THE INVENTION

It is an object of the invention to provide co-extruded or co-molded, or calendered articles that have superior and novel combinations of properties. It is a further object of the invention to provide methods of manufacture that allow higher rates and that can be achieved at less expense than the prior art allows.

The invention provides a method of producing an article of manufacture comprising a thermoplastic polymer and a moisture-curable polymer, the method comprising introducing said thermoplastic polymer and said moisture-curable polymer separately into a die or mold wherein said polymers come into intimate contact, and curing said moisture-curable polymer by exposure to moisture.

The invention also provides a method of producing an article of manufacture comprising a thermoplastic polymer and a microwave, dielectric or radio frequency curable polymer comprising introducing said thermoplastic polymer and said microwave, dielectric or radio frequency curable polymer separately into a die or mold where said polymers come into intimate contact, and curing said microwave, dielectric or radio frequency curable polymer by exposure to microwave, dielectric or radio frequency energy.

The invention also provides a method for producing an article of manufacture comprising a thermoplastic polymer and a curable polymer, said method comprising the steps of calendering said thermoplastic polymer into a first sheet, calendering said curable polymer into a second sheet, pressing said first sheet together with said second sheet, and curing said curable polymer.

The curable polymers of the invention may be selected from moisture-curable and microwave, dielectric or radio frequency curable polymers. The curing of the curable polymer typically occurs entirely or to the greatest extent after the introduction or contact with the thermoplastic polymer, but, if desired, some curing may take place prior to the introduction or contact of the curable polymer and the thermoplastic polymer.

DETAILED DESCRIPTION OF THE INVENTION

Figure 1:
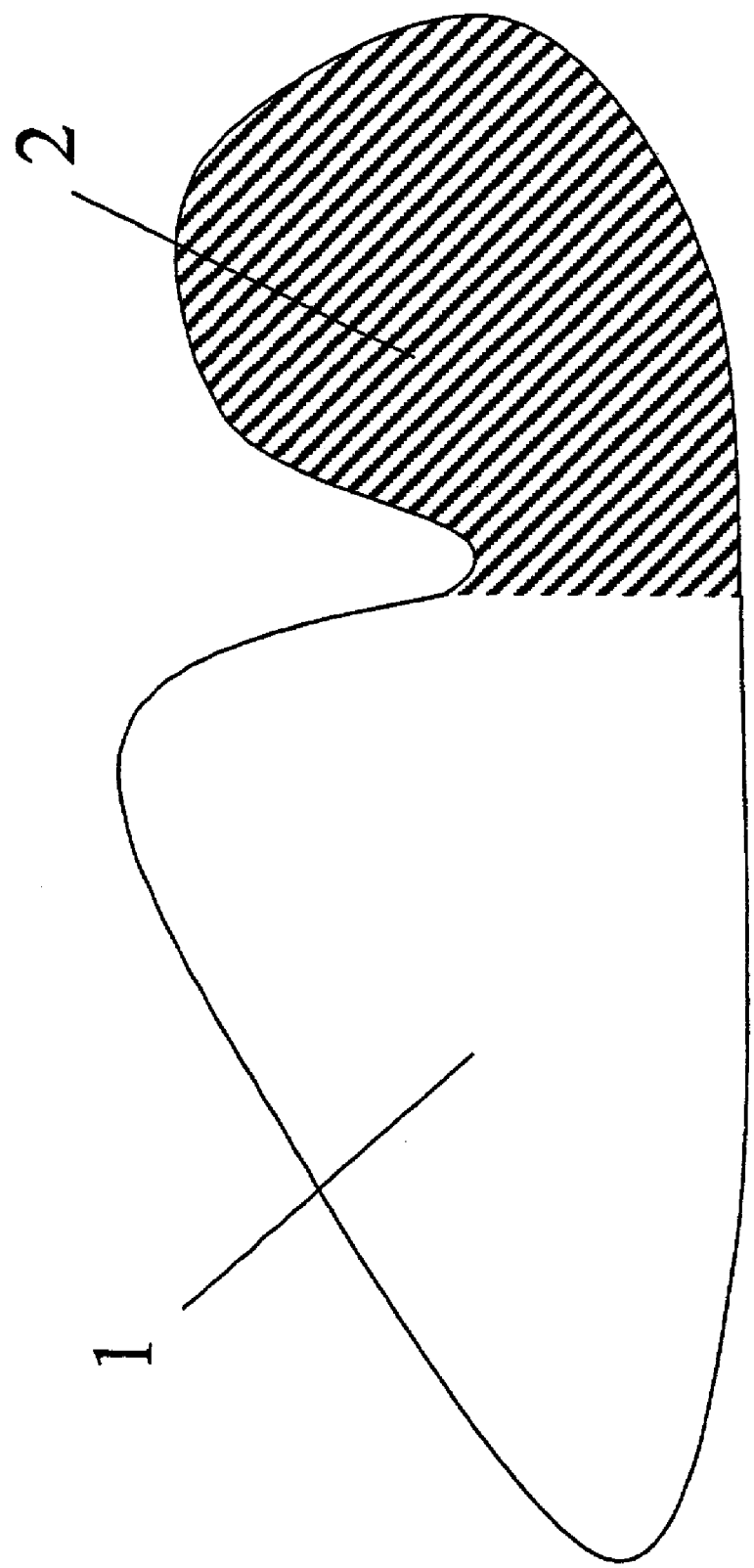
FIG. 1 shows a cross section of a co-extruded or molded profile.

Compositions and methods for co-extruding and co-injection molding products and the like which comprise cross-linked and un cross-linked elements. The products are produced with certain formulations of cross linkable polymers that enable the combination of cross linkable and non cross linkable polymers to be crosslinked with out damage or deformation of the un crosslinked components. Methods of cross-linking the articles are also disclosed. In one embodiment a microwave, dielectric or radio frequency curable polymer is co-extruded or co-molded with a thermoplastic polymer. In another embodiment a moisture-curable polymer is co-extruded or co-molded with a thermoplastic polymer. These articles find use on a number of consumer products and extruded profiles.

In one embodiment of the invention, a thermoplastic polymer is coextruded with a moisture-curable polymer. Both may be coextruded at high temperatures and speed. The coextruded article is then cooled in water. The water starts the curing process of the moisture-curable polymer as it cools both polymers in the article. The moisture-curable polymer can cure after sufficient time at room temperature or the cure may be accelerated by placing the entire article in a chamber containing high humidity, typically at 60–70 C, well below the melting point of the thermoplastic polymer. Uses of these articles may include but are not limited to weather stripping where either part of the weather-stripping may come into contact with heat or is clamped into an attachment where low compression set and creep and higher modulus are desired and the other part is desired to be soft, foamed or the like.

In an other embodiment of the invention, a thermoplastic polymer is coextruded completely over and around a moisture curable polymer. Both may be coextruded at high temperatures and speed. The coextruded article is then cooled in water. The water starts the curing process of the moisture-curable polymer as it cools both polymers in the article. The amount of water necessary for curing will quickly diffuse through the thermoplastic polymer or water may be introduced into hollow portions of the article. The moisture-curable polymer can cure after sufficient time at room temperature or the cure may be accelerated by placing the entire article in a chamber containing high humidity, typically at 60–70 C, well below the melting point of the thermoplastic polymer. Uses of these articles may include but are not limited to weather stripping where the outside is desired to be soft and pliable or foamed and the inside is desired to be stiff and creep and higher modulus resistant and have good elastic recovery.

In another embodiment of the invention, a moisture-curable polymer is coextruded completely over and around a thermoplastic polymer. Both may be coextruded at high temperatures and speed. The coextruded article is then cooled in water. The water starts the curing process of the moisture-curable polymer as it cools both polymers in the article. The moisture-curable polymer can cure after sufficient time at room temperature or the cure may be accelerated by placing the entire article in a chamber containing high humidity, typically at 60–70 C, well below the melting point of the thermoplastic polymer. Uses of these articles may include but are not limited to weather stripping where the outside is desired to have elastic recovery, abrasion and heat resistance and the inside is desired to be soft and resilient.

In another embodiment, a thermoplastic polymer is molded over a moisture-curable polymer. Both may be molded at the same rates as if they were thermoplastic. The article may then be cured over time at room temperature or cured at a faster rate in a warm water bath or high a chamber containing high humidity, typically at 60–70 C, well below the melting point of the thermoplastic polymer. Use for these articles include but are not limited to handles for ovens, pots or heating devices where the metal attachment might be very hot and cause a thermoplastic to melt and where the outside of the handle is desired to be soft and grippable.

In another embodiment a moisture-curable polymer is molded over curable a thermoplastic polymer. Both may be molded at the same rates as if they were thermoplastic. The article may then be cured over time at room temperature or cured at a faster rate in a warm water bath or high a chamber containing high humidity, typically at 60–70 C, well below the melting point of the thermoplastic polymer. Use for these articles include but are not limited to handles for tools or bumpers where the inside is desired to be soft and absorb shock and where the outside is desired to be hard, abrasion resistant or heat resistant.

Polymers that can be cross linked with peroxide can be made to be moisture-curable by grafting 0.1 to about 5% vinyl trimethoxysilane, for example, on their backbone with organic peroxide in an extruder of suitable length at a temperature over the decomposition temperature of the peroxide and with the addition of 0.1 to about 1% peroxide, 0.1 to about 3% dibutyl tin dilaurate, carboxylate of zinc, lead, iron or cobalt or certain base or acid catalysts. Such mixtures of moisture cure systems are commercially available from OSI Inc. as Silcat R®. Other combinations of silanes, peroxides and catalysts are available or can be custom blended for specific applications. The polymer may be grafted in the extruder and then injected directly in the production of the article of manufacture or can be pelletized for later use. Other moisture cure systems utilizing various chemistry are also available. Moisture cure takes place when the hydrolysable silane groups are hydrolysed under the influence of water, resulting in the splitting-off of alcohol and the formation of silanol groups. In a second step the silanol groups are crosslinked by a condensation reaction. In both steps a silanol condensation catalyst is used as a catalyst.

Moisture-curable polymers based on polyethylene are commercially available and can be used in the invention. Most olefins or other polymers that can be crosslinked with organic peroxides can be crosslinked with moisture. Polymers that can be cross linked with peroxide can be made to be moisture-curable by grafting vinyl trimethoxy silane on their backbone with organic peroxide in an extruder of suitable length and with the addition of dibutyl tin dilaurate catalyst. Extruders suitable for grafting of polymers typically have a length over diameter ratio of over 20 to 1. Extrusion temperatures must be high enough to decompose the organic peroxide, typically over 150 degrees Celsius. Mixtures of moisture cure systems are commercially available from OSI Inc. as Silcat R®. Other combinations of silanes, peroxides and catalysts are available or can be custom blended for specific applications. The polymer may be grafted in the extruder or injector and then extruded or injected directly in the production of the article of manufacture or can be pelletized for later use. Other moisture cure systems utilizing various chemistry are also available. Polymers to be grafted or pre-grafted polymers should be dried beforehand, typically to moisture contents below 400 ppm. Extruders and equipment to coextrude profiles are commercially available from companies such as Davis Standard. Two or more extruders are typically connected to a crosshead die to extrude the profile. While injecting more than one polymer into a mold in the desired location is more complex than with one polymer, many custom designed systems exist. Equipment to co-injection mold articles is commercially available from companies such as Cincinnati Milacron.

In another embodiment a thermoplastic polymer is co-extruded with a microwave curable polymer. The entire article is then exposed to microwave, dielectric or radio frequency energy. Only the polymer is excited by the microwave, dielectric or radio frequency energy, it is heated and cured. Cool air or other cooling mediums can be directed over the article to cool the thermoplastic part. Uses of these articles may include but are not limited to weather stripping where either part of the weather-stripping may come into contact with heat or is clamped into an attachment where low compression set and creep and higher modulus. are desired and the other part is desired to be soft, foamed or the like.

In another embodiment a thermoplastic polymer is co-extruded completely over and around a microwave curable polymer. The entire article is then exposed to microwave, dielectric or radio frequency energy. In embodiments of the invention, only the polymer that is excited by the microwave, dielectric or radio frequency energy is heated and cured. Cool air or other cooling medium can be directed over the article to cool the thermoplastic part. Uses of these articles may include but are not limited to weather stripping where the outside is desired to be soft and pliable or foamed and the inside is desired to be stiff and creep and higher modulus. resistant and have good elastic recovery.

In another embodiment a microwave, dielectric or radio frequency curable polymer is coextruded completely over and around a thermoplastic polymer. The entire article is then exposed to microwave, dielectric or radio frequency energy. In embodiments of the invention, only the polymer that is excited by the microwave, dielectric or radio frequency energy is heated and cured. Uses of these articles may include but are not limited to weather stripping where the outside is desired to have elastic recovery, abrasion and heat resistance and the inside is desired to be soft, resilient, foamed or the like.

In another embodiment a thermoplastic polymer is molded over a microwave, dielectric or radio frequency curable polymer. Both may be molded at the same rates as if they were thermoplastic. The entire article is then exposed to microwave, dielectric or radio frequency energy. In embodiments of the invention, only the polymer that is excited by the microwave, dielectric or radio frequency energy is heated and cured. Uses for these articles include but are not limited to handles for ovens, pots or heating devices where the metal attachment might be very hot and cause a thermoplastic to melt and where the outside of the handle is desired to be soft and grippable.

In another embodiment a microwave, dielectric or radio frequency curable polymer is molded over a thermoplastic polymer. The entire article is then exposed to microwave, dielectric or radio frequency energy. In embodiments of the invention, only the polymer that is excited by the microwave, dielectric or radio frequency energy is heated and cured. Use for these articles include but are not limited to handles for tools or bumpers where the inside is desired to be soft and absorb shock and where the outside is desired to be hard, abrasion resistant or heat resistant.

Extruders and equipment to co-extrude profiles is commercially available from companies such as Davis Standard. Two or more extruders are typically connected to a cross-head die to extrude the profile. While injecting more than one polymer into a mold in the desired location is more complex than with one polymer, many custom designed systems exist. Equipment to co-injection mold articles is commercially available from companies as Cincinnati Milacron.

In another embodiment a thermoplastic polymer is calendered into a sheet and pressed together with a moisture-curable or microwave, dielectric or radio frequency curable polymer that has been calendered into a sheet in the rolls of a calendar or by other pressure. The composite sheet is exposed to microwave, dielectric or radio frequencies or moisture, depending on the curing method required to cure the curable polymer.

In each of the above embodiments with a microwave, dielectric or radio frequency curable polymer the microwave, dielectric or radio frequency curable polymer may be foamable by means of any method available in the art. In addition the microwave, dielectric or radio frequency energy may aid in the foaming due to the heat generated in the system by microwave, dielectric or radio frequency energy that also cures the system or by direct heating of the foaming agent due to microwave energy.

In each of the above embodiments with a moisture-curable polymer the moisture-curable polymer may be foamable by means of any method known in the art.

In each of the above embodiments the uncured thermoplastic polymers may be foamable by the inclusion of a foaming agent or by means of any method known in the art. In addition the microwave, dielectric or radio frequency energy may aid in the foaming by foaming agents known in the art to be excited or heated by microwave, dielectric or radio frequency energy including water even though the thermoplastic does not cure.

In each of these embodiments the thermoplastic polymer may be but is not limited to a polyolefin with 2 to 20 carbon atoms, EP, EPR or EPDM rubbers, a polypropylene or polypropylene copolymer, styrenic homopolymers or copolymers, thermoplastic elastomer containing pre crosslinked EPDM or other rubber such as Santoprene® from Advanced Elastomer Systems, acrylonitrile/styrene/butadiene polymers, copolymers, terpolymers and block copolymers and terpolymers, nylon 6 or nylon 6–6 or nylon 12, and polyester resins, or combinations of the foregoing thermoplastic polymers. The thermoplastic polymers may contain foaming agents. It should be noted that some or all of these polymers may be able to be crosslinked with the proper additives under the proper conditions but primarily are intended to be used as thermoplastics in the present invention.

The thermoplastic polymer may not contain carbon black in amounts over minimum amounts to give color or provide UV protection and only then if the microwave, dielectric or radio frequency curable polymer has much greater response to microwave, dielectric or radio frequency energy. If the thermoplastic polymer is responsive to microwave, dielectric or radio frequency energy the microwave, dielectric or radio frequency curable polymer should incorporate 0.1% to 50%, preferably 0.1% to about 5% additives, such as carbon black, carbon soot, carbon fibrils, nanotubes, ethoxylated amines, monoglycol ester of fatty acid, diglycol ester of fatty acid, or a polyglycol ester of a fatty acid, water or other polarizing material so that the polarity of the material will cause heating by dielectric loss upon the application of microwave, dielectric or radio frequency energy to increase its response.

In each of these embodiments the moisture-curable polymer may be but is not limited to RTV silicon compounds, commercially available polymers such as Aquathene® from Equistar chemicals, Aqualink® from AT plastics and Sil-ink® from Union Carbide, styrenic homopolymers or copolymers polyethylene, polyolefins with 2 to 20 carbon atoms, copolymers of ethylene and a mono-unsaturated ester such as vinyl esters, acrylic acid esters and methacrylic esters, as well as terpolymers of these polymers. Polymers such as nitrile rubber, SBS, EP, EPR and EPDM rubber, butyl rubber and the like may also be used as well as mixtures of the foregoing moisture-curable polymers.

In each of these embodiments the microwave, RF or dielectrically curable polymer can be a silicon rubber, a polyolefin with 2 to 20 carbon atoms as well as copolymers or terpolymers of these polymers. styrenic homopolymers or copolymers. Polymers such as nitrile rubber, SBR, SBS, EP, EPR and EPDM rubber, butyl rubber and the like may be used, and polar copolymers of ethylene and a mono-unsaturated ester are preferred.

Microwave, dielectric or radio frequency curing may be enhanced or accelerated by the addition of from 0.1 up to about 50% by weight of the polymer of carbon black or carbon soot or carbon fibrils or nanotubes from 0.1 to about 5% ethoxylated amines, monoglycol ester of fatty acid, diglycol ester of fatty acid, or a polyglycol ester of a fatty acid water or other polarizing material so that the polarity of the material will cause heating by dielectric loss upon the application of microwave, dielectric or radio frequency energy.

Microwave curing can be carried out at standard frequencies of between 915 and 2,415 MHz or at different frequencies or by a sweep of frequencies or pulsed frequencies that are advantageous to the material type, shape and composition or at radio frequencies of around 10,000 HZ or any frequency in between that causes dielectric heating of the polymer to be cured. Microwave frequency energy will usually result in the fastest, most efficient cure. The lower frequencies are preferred if the polymer contains metallic components or fillers. If the polymer contains a substantial metal component it may be possible to cure it by inductively heating at lower frequencies but the mass of the polymer would not be evenly heated so great care must be taken not to overheat the polymer next to the metal. Higher frequencies and electron beams can also be used but this equipment is much more expensive and requires special enclosures. Power required depends on the dielectric constant of the polymer compound, its power factor, the frequency of the electromagnetic energy and the voltage applied. Times to cure can be very short, especially for microwaves because the entire interior volume of the part is heated at the same time. Cure time will vary depending on the energy applied and the maximum temperature allowed. Organic peroxides used for curing, for example can decompose and cause cross-linking in from a few minutes at 150 degrees C. to a few seconds at 200 degrees C. By control of the microwave, dielectric or radio frequency energy the article can be quickly brought to and then held at the desired temperature.

Waveguides for the microwave, dielectric or radio frequency energy, devices that turn or reposition the material, variations in the microwave chamber size and placement of supplementary loss less dielectric materials within a part of the curing chamber are also known to enhance the microwave, dielectric or radio frequency curing process.

Microwave, dielectric or radio frequency curing may be enhanced or accelerated by the addition of from 0.1 up to about 5% heat activated cure systems such as sulfur and accelerator cure systems, or organic peroxides. Peroxides such as dicumyl peroxide, which has a half life at 171 degrees C. of about 1 minute may be used or other peroxides which have much higher temperature half lives at one minute may be used advantageously, even though they have higher cost because they allow higher extrusion temperatures and speed and cause little disadvantage because the microwave curing can quickly bring the polymer to the higher cure temperature.

Adhesion of the coextruded, calendered or injected molded articles in each of the embodiments is generally good and the peroxides, sulfur and moisture additives in the embodiments of the invention usually migrate to the thermoplastic polymer and cause interfacial cross links.

Even though polymers cured by microwaves may need to be extruded or molded at lower speeds and temperatures due to the presence of heat activated cure systems such as sulfur and accelerator cure systems or organic peroxides, they cure much faster because the microwave, dielectric or radio frequency energy heats the entire mass and volume of the polymer simultaneously at a higher rate than can be accomplished by steam, radiant or other methods known in the art that heat from the surface inward because most polymers are thermal insulators. Higher temperature peroxides may be used without significantly slowing the cure because of the higher cure rate possible and scorch retarders such antioxidants that interfere with peroxide free radicals may be used to further improve molding or extrusion speeds.

Molded for the purposes of this application is defined as co-injection molded including the processes of injection molding, compression molding, compression injection molding, fusible core injection molding, gas assisted injection molding, lamella injection molding, live feed injection molding, low pressure injection molding, push pull injection molding, structural foam molding other molding processes.

All of the polymers in the above embodiments may contain additives known in the art such as internal and external lubricants, stabilizers, antioxidants, light stabilizers and colorants as long as the colorant doesn't cause excessive dielectric heating on parts of the embodiments that are not intended to be heated.

All of the polymers of the invention may include fillers such as glass and Kevlar® fibers, calcium carbonate, silica, clay and talc.

FIGS. 1 through 5 show very general cross sections of co-extruded, co-molded or calendered articles that are objects of the invention. These profiles may take on almost any shape that is required for their function in their end use. The drawings are not meant to be limiting as to shape or size. The objects of the invention may also have several areas of thermoplastic and thermoset materials if desired.

FIG. 1 shows a cross section of a co-extruded or molded profile where either part 1 or part 2 may be the thermoplastic part. Whichever part (i.e. part 1 or part 2) that is not thermoplastic may be microwave or moisture-curable depending on the properties desired.

Figure 2:
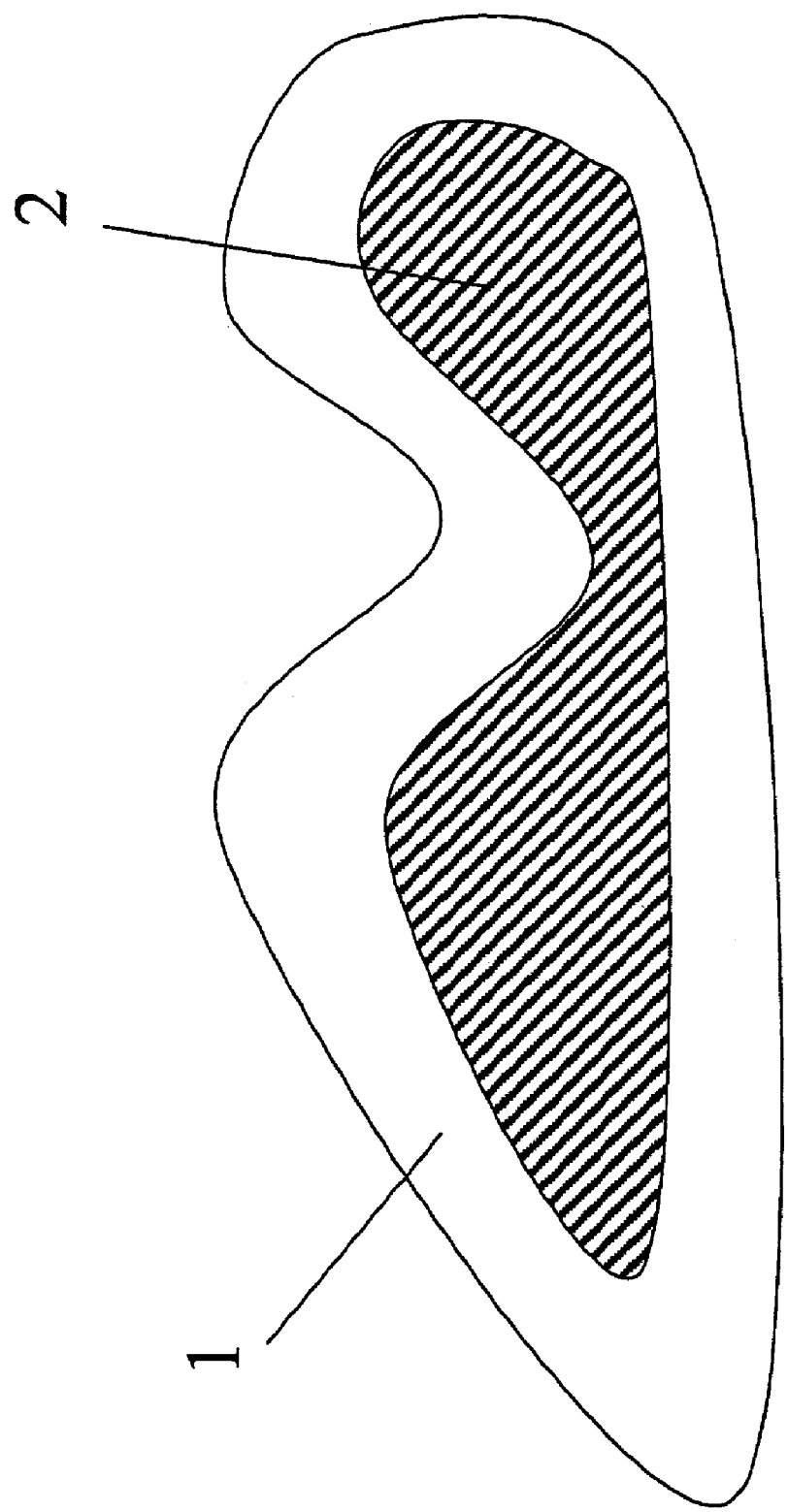
FIG. 2 shows a cross section of a co-extruded profile where a portion is co-extruded completely over and around another portion.

FIG. 2 shows a cross section of a co-extruded profile where part 1 is coextruded completely over and around part 2, where either parts 1 and 2 may be the thermoplastic part and either other part 1 or 2 that is not thermoplastic maybe microwave or moisture-curable depending on the properties desired.

Figure 3:
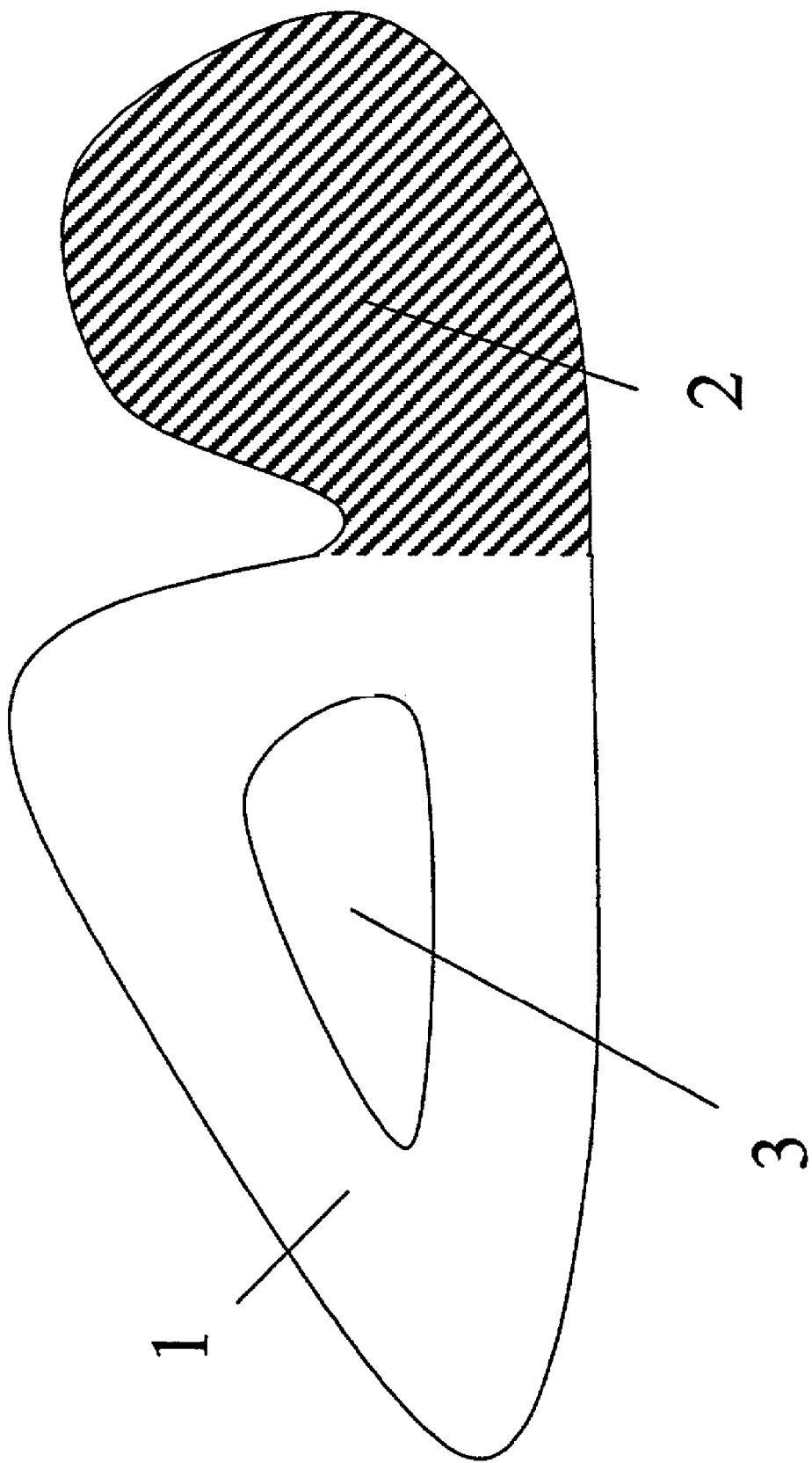
FIG. 3 shows a cross section of a co-extruded profile having a portion with a hollow section.

FIG. 3 shows a cross section of a co-extruded profile where either parts 1 and 2 may be the thermoplastic part and either other part 1 or 2 that is not thermoplastic may be microwave or moisture-curable depending on the properties desired and 3 may be a hollow section that may be desired for function, for example, for cooling or uniform extrusion or material savings or may carry an electrical conductor.

Figure 4:
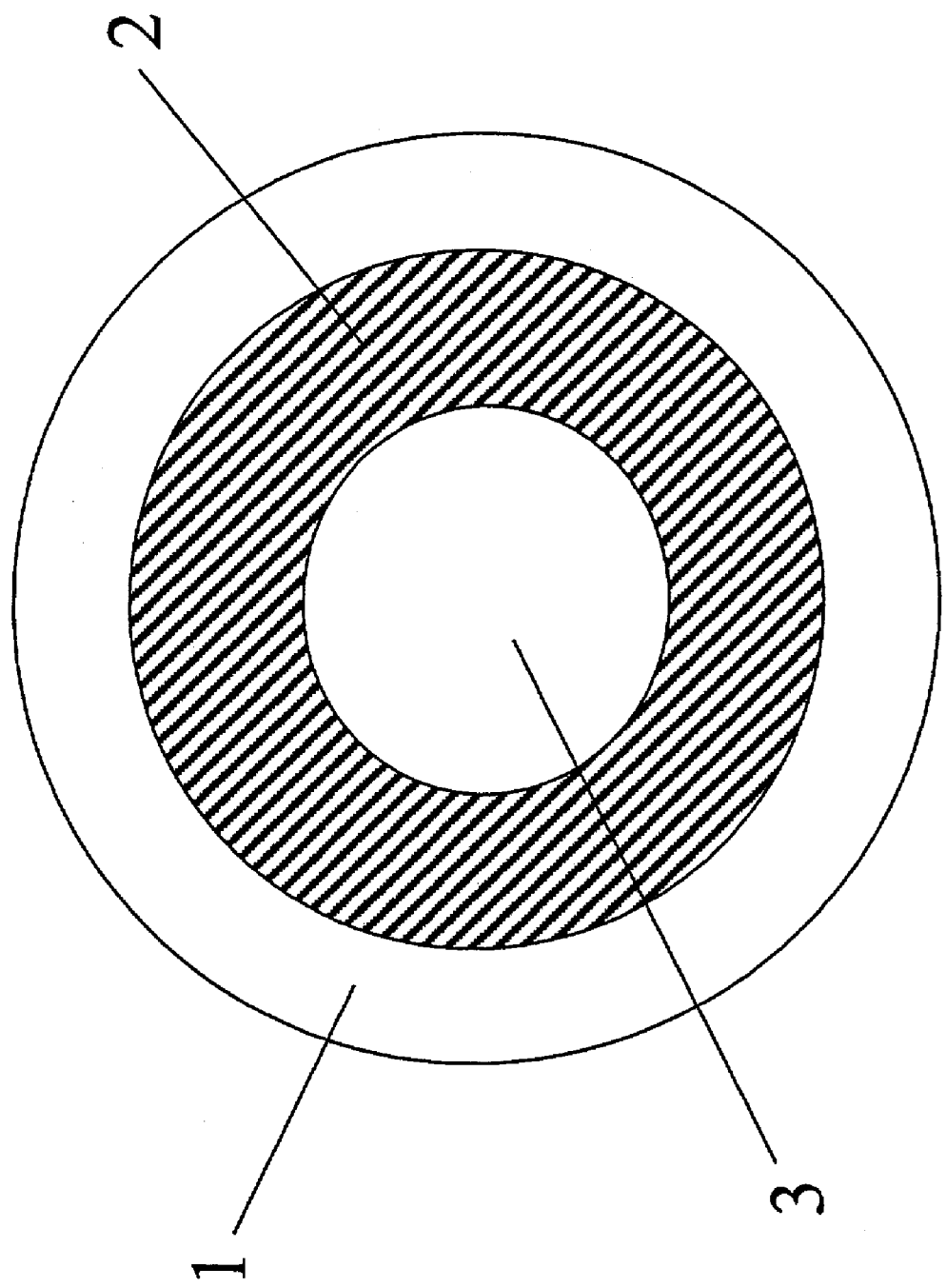
FIG. 4 shows a cross section of an article with a circular cross-sectional shape.

FIG. 4 shows a cross section of a co-molded article where either parts 1 and 2 may be the thermoplastic part and either other part 1 or 2 that is not thermoplastic may be microwave or moisture-curable depending on the properties desired and 3 is hollow section to be used for attachment, for example.

Figure 5:
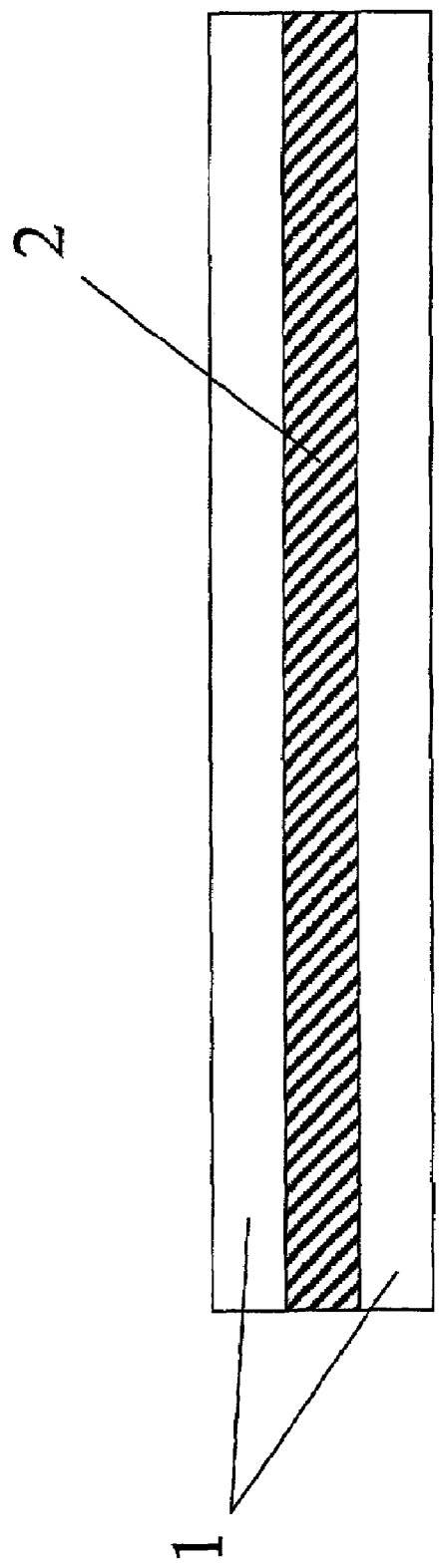
FIG. 5 shows a cross section of a calendered profile.

FIG. 5 shows a cross section of a calendered profile where either parts 1 and 2 may be the thermoplastic part and either other part 1 or 2 that is not thermoplastic may be microwave or moisture-curable depending on the properties desired.

Although the invention is illustrated and described herein as embodied in a method and materials for co-extruded or co-injected articles, it is nevertheless not intended to be limited to the details described, since various modifications and structural changes may be made therein without departing from the sprit of the invention and within the scope and range of equivalents of the claims.

What is claimed is:

1. A method of producing an article of manufacture comprising a thermoplastic polymer and a moisture-curable polymer, said method comprising introducing said thermoplastic polymer and said moisture-curable polymer separately into a die or mold wherein said polymers come into intimate contact, and curing said moisture-curable polymer by exposure to moisture wherein said cured moisture-curable polymer can not be further shaped by heat and wherein said moisture-curable polymer is co-extruded completely over and around said thermoplastic polymer.

2. A method of producing an article of manufacture comprising a thermoplastic polymer and a microwave, dielectric or radio frequency curable polymer comprising introducing said thermoplastic polymer and said microwave, dielectric or radio frequency curable polymer separately into a die or mold where said polymers come into intimate contact, and curing said microwave, dielectric or radio frequency curable polymer by exposure to microwave, dielectric or radio frequency energy, wherein the curable polymer is selected from the group consisting of RTV silicon compounds, styrenic homopolymers or copolymers, polyethylene, polyolefins comprising repeating units having from 3 to 20 carbon atoms: co-polymers of ethylene and a mono-unsaturated ester as well as terpolymers of these polymers, nitrile rubber, SBS, SBR, EP and EPR rubbers, and butyl rubber and wherein said microwave, dielectric or radio frequency curable polymer is co-extruded completely over and around said thermoplastic polymer.

3. The method according to claim 1 wherein said thermoplastic polymer includes a foaming agent.

4. The method according to claim 2 wherein said thermoplastic polymer includes a foaming agent.

5. The method according to any of claims 2 or 4 wherein said microwave, dielectric or radio frequency curable polymer includes a foaming agent.

6. The method according to any of claims 1 or 3 wherein said moisture-curable polymer includes a foaming agent.

7. The method according to claim 5 wherein the microwave, dielectric or radio frequency energy aids in the foaming due to the heat generated in the system by said microwave, dielectric or radio frequency energy that also cures the curable polymer.

8. The method according to claim 5 wherein the thermoplastic polymer is foamed and the microwave, dielectric or radio frequency energy aids in the foaming of the foaming agent in the thermoplastic polymer when excited by the microwave, dielectric or radio frequency energy.

9. The method according to claim 3 or claim 4 wherein the thermoplastic polymer is foamed by the foaming agent due to a change in pressure upon exiting the die.

10. The method according to claim 6 wherein the moisture-curable polymer is foamed by the foaming agent due to a change in pressure upon exiting the die.

11. The method according to any of claims 1 or 2 wherein the thermoplastic polymer is selected from the group consisting of polyolefins having 2 to 20 carbon atoms; EP, EPR or EPDM rubbers; styrene/butadiene polymers, copolymers or block copolymers; polypropylene or polypropylene copolymers; styrene homopolymers or copolymers; thermoplastic elastomers; nylon 6, nylon 6—6 or nylon 12, and polyester resins.

12. The method according to claim 1 wherein the moisture-curable polymer is selected from the group consisting of RTV silicon compounds; styrenic homopolymers or copolymers; polyethylene, polyolefins comprising repeating units having from 3 to 20 carbon atoms; co-polymers of ethylene and a mono-unsaturated ester as well as terpolymers of these polymers; nitrile rubber, EP, EPR and EPDM rubbers, and butyl rubber.

13. The method according to claim 2 wherein the microwave curable polymer, dielectric or radio frequency curable polymer is selected from the group consisting of co-polymers of ethylene and a mono- unsaturated ester, ethylene vinyl acetate and nitrile rubber.

14. The method according to claim 2 wherein the microwave, dielectric or radio frequency curable polymer further comprises from 0.1% up to about 50% by weight, based on the curable polymer, of an additive selected from the group consisting of carbon black, carbon soot, carbon fibrils, nanotubes, ethoxylated amines, a monoglycol ester of fatty acid, a diglycol ester of fatty acid, a polyglycol ester of a fatty acid, water and combinations of these polarizing materials, wherein the polarity of the additive causes heating by dielectric loss upon the application of microwave, dielectric or radio frequency energy.

15. The method according to claim 2 wherein the microwave, dielectric or radio frequency curable polymer further comprises a heat activated cure system selected from the group consisting of sulfur cure systems and organic peroxides.

16. The method according to claim 1 or claim 2 wherein migration of the curable polymer into the thermoplastic polymer causes interfacial cross links and improves the adhesion of the thermoplastic and curable polymers.

17. The method according to claim 2 wherein the microwave, dielectric or radio frequency curable polymer is cured by microwave energy in the frequency range of about 915 to about 2,415 MHz.

18. The method according to claim 2 wherein the microwave, dielectric or radio frequency curable polymer is cured by energy in the frequency range of less than about 900 MHz.

19. The method according to claim 1 or claim 2 wherein said article has a circular cross-sectional shape.

20. The method according to claim 1 or claim 2 wherein said article of manufacture is electrically conductive wire or cable.

21. A method of producing an article of manufacture comprising a thermoplastic polymer and a moisture-curable polymer, said method comprising introducing said thermoplastic polymer and said moisture-curable polymer separately into a die or mold wherein said polymers come into intimate contact, and curing said moisture-curable polymer by exposure to moisture wherein said cured moisture-curable polymer can not be further shaped by heat and wherein the moisture cure system is vinyl trimethoxy silane, organic peroxide and dibutyl tin dilaurate catalyst.

* * * * *